US006816576B2

(12) United States Patent
Kasvand et al.

(10) Patent No.: US 6,816,576 B2
(45) Date of Patent: Nov. 9, 2004

(54) TREE HIERARCHY AND DESCRIPTION FOR GENERATED LOGS

(75) Inventors: Tonis Kasvand, Nepean (CA); Thomas Gray, Carp (CA); Brian Mooy, Kingston (CA); Dennis Fortin, Belleville (CA); Audil Virk, Kingston (CA); Tyler Elliot, Picton (CA); Rebecca Jones, Napanee (CA)

(73) Assignee: Mitel Knowledge Corporation, Kanata (CA)

( * ) Notice: Subject to any disclaimer, the term of this patent is extended or adjusted under 35 U.S.C. 154(b) by 0 days.

(21) Appl. No.: 09/832,734

(22) Filed: Apr. 11, 2001

(65) Prior Publication Data

US 2002/0021788 A1 Feb. 21, 2002

(30) Foreign Application Priority Data

Apr. 12, 2000 (GB) .............................. 0009067

(51) Int. Cl.[7] .......................... H04M 1/24; H04M 3/08; H04M 3/22
(52) U.S. Cl. .................. 379/9.04; 379/9.03; 379/32.01; 714/25; 714/57
(58) Field of Search .............................. 379/1.01–9.03, 379/9.04, 32.01, 32.05; 714/100, 25, 26, 27, 39, 46, 47, 48, 57

(56) References Cited

U.S. PATENT DOCUMENTS

| 4,456,788 | A | * | 6/1984 | Kline et al. .................. 379/137 |
| 4,972,453 | A | * | 11/1990 | Daniel, III et al. ...... 379/10.01 |
| 5,295,244 | A | | 3/1994 | Dev et al. |
| 6,032,184 | A | * | 2/2000 | Cogger et al. ............... 709/223 |
| 6,298,119 | B1 | * | 10/2001 | Shaffer et al. ........... 379/29.07 |
| 6,353,902 | B1 | * | 3/2002 | Kulatunge et al. .......... 714/712 |
| 6,445,774 | B1 | * | 9/2002 | Kidder et al. ............... 379/9.03 |
| 6,690,274 | B1 | * | 2/2004 | Bristol ........................ 340/506 |

FOREIGN PATENT DOCUMENTS

| EP | 0650302 | | 1/1997 | |
| EP | 0959398 | | 11/1999 | |
| EP | 0959398 | A1 * | 11/1999 | ........... G05B/23/02 |
| JP | 2000209203 | | 7/2000 | |
| WO | WO9419887 | | 9/1994 | |
| WO | WO9419912 | | 9/1994 | |
| WO | WO0072514 | | 11/2000 | |

OTHER PUBLICATIONS

S. Karki, et al. "Implementation of a fault tree method", Satu.Karki@vtt.fi, Juhani.Hyvarinen@vtt.fi (Abstract).
Gardner, et al. "Methods and Systems for Alarm Correlation", 1996 IEEE, pp. 136–140.
European Search Report Appln No. 01 30 3443 dated Feb. 20, 2003.
Annex to the European Search Report on European Patent Appln. No. EP 01 30 3443 dated Feb. 20, 2003.
Search Report of Great Britain Application No. 9927595.0.

* cited by examiner

Primary Examiner—Quoc Tran
(74) Attorney, Agent, or Firm—F. Chau & Associates, LLC

(57) ABSTRACT

A method of generating a tree hierarchy display of error logs received from network devices and applications, each of the logs including a brief description of error cause and predetermined higher level ones of the logs being created in response to generation of predetermined combinations of lower level ones of the logs in accordance with user defined rule set criteria. The method comprises the steps of generating a user interface for entering explanations associated with predetermined ones of the error logs, storing the lower level ones of the logs used in meeting the rule set criteria, and displaying a tree hierarchy of the logs for any fully satisfied rule set criteria by attaching links between the logs in relation to the rule set criteria.

4 Claims, 6 Drawing Sheets

| Log ID | Time Generated | Brief Description |
|---|---|---|
| LogP6000 | Feb. 29, 2000 14:23:04:12 | No dial tone for phone P2. |
| LogPBX2000 | Feb. 29, 2000 14:23:04:17 | PBX 1 is not receiving full services |
| LogP6001 | Feb. 29, 2000 14:23:04:27 | Reduction of features available for phone P4. |
| LogC3000 | Feb. 29, 2000 14:23:04:29 | Client C1 cannot give services to phones. |
| HLL002 | Feb. 29, 2000 14:23:04:32 | Loss of services on network. |
| LogP6002 | Feb. 29, 2000 14:23:05:00 | No services available for phone P1. |
| HLL001 | Feb. 29, 2000 14:23:05:03 | PBX 1 is not providing full services to phones. |
| HLL003 | Feb. 29, 2000 14:23:05:05 | Trunk T1 is unavailable. |

Figure 2

| HLL ID | Rule Set | Brief Explanation |
|---|---|---|
| HLL001 | (LogP6000 or LogP6001 or LogP6002) from 2 or more phones. | Two or more phones are not receiving full services |
| HLL002 | LogPBX2000 + LogC3000 | Loss of services. Something is wrong with PBX2 |
| HLL003 | HLL001 + HLL002 | Loss of services. Something is wrong with T1 trunk. |

Figure 3

| Log ID | Time Generated | Brief Description |
|---|---|---|
| LogP6000 | Feb. 29, 2000 14:23:04:12 | No dial tone for phone P2. |
| LogPBX2000 | Feb. 29, 2000 14:23:04:17 | PBX 1 is not receiving full services |
| LogP6001 | Feb. 29, 2000 14:23:04:27 | Reduction of features available for phone P4. |
| LogC3000 | Feb. 29, 2000 14:23:04:29 | Client C1 cannot give services to phones. |
| HLL002 | Feb. 29, 2000 14:23:04:32 | Loss of services on network. |
| LogP6002 | Feb. 29, 2000 14:23:05:00 | No services available for phone P1. |
| HLL001 | Feb. 29, 2000 14:23:05:03 | PBX 1 is not providing full services to phones. |
| HLL003 | Feb. 29, 2000 14:23:05:05 | Trunk T1 is unavailable. |

Figure 5

| Smart Logs |||
| File Edit View Tools etc. |||

Logs Tree Heirarchy Menu

| Logs | Explanation |
|---|---|
| LogP6000 | The phone P2 is not receiving a dialtone so the user cannot use the phone. |
| LogP6001 | The phone P4 is not receiving all the services that it should be receiving. |
| LogP6002 | The phone P1 has no services available, but basic phone calls can be made. |
| LogC3000 | The Client C1 is not providing services to phones due to a problem either at the client or the connected PBX. |
| LogPBX2000 | The PBX 1 is not receiving full services from PBX 2. |
| HLL001 | PBX 1 is not providing full services to 2 or more phones. |
| HLL002 | PBX 2 is having problems providing services to Client 1 and PBX 1. |
| HLL003 | Since PBX 2 is having problems providing services as well as PBX 1, the trunk T1 is having problems. |
|  |  |

Edit Explanation

Save Explanation

See Tree Heirarchy

TREE HIERARCHY AND DESCRIPTION FOR GENERATED LOGS

FIELD OF THE INVENTION

This invention relates in general to network diagnostics, and more particularly to a network administration system for utilizing the results generated by rule sets to display the tree hierarchy of the logs that satisfy the rule sets' criteria and provide a full explanation of the problems that triggered the logs.

BACKGROUND OF THE INVENTION

It is well known in traditional computer and digital communication networks for technicians to respond to the generation of error logs by notifying affected users of system problems, analyzing and then fixing the problems using an assortment of software commands and/or tools. It is known in the art for logs to be filtered through 'rule sets' to determine if a combination of logs (Low Level Logs (LLL)) satisfies a given criteria. If the criteria is satisfied, another log is generated (High Level Log (HLL)) to give an overall summary or description of the problem to the network administrator.

SUMMARY OF THE INVENTION

According to the present invention, a network administration system is provided for displaying the logs that have satisfied a rule-set criteria using a tree hierarchy with full explanations for each LLL and HLL. This display makes it easier for the user to see the flow of logs and also demonstrates the true cause of a problem. Using this information, the user may fix the root of the problem and avoid wasting time on proliferated failures caused by a root source.

Possible applications of the system according to the present invention are:

Monitor the status of developing code (testing/debugging);
Quick and summarized reports of a systems status;
Customer support usage of tree hierarchical logs to either assist with customers faster or pass the information as a problem report.
Marketing and Sales research of customer product usage (e.g. monitoring specific system activities and describing the usage behavior of customers).

BRIEF DESCRIPTION OF THE DRAWINGS

A detailed description of the preferred embodiment is set forth herein below with reference to the following drawings, in which:

FIG. 2 is a table of a set of rules that have been defined for use in the network of FIG. 1;

FIG. 3 is a table showing an exemplary list of logs generated by the network of FIG. 1;

FIG. 5 is shows a graphical user interface of a tree hierarchy menu for use in the system of the present invention.

DETAILED DESCRIPTION OF THE PREFERRED EMBODIMENTS

Traditionally, system error logs have been analyzed through human intervention in order to determine the sources of and to correct system errors. Thousands of logs can be generated by a single problem. For example, if a T1 line goes down, error logs could be generated by thousands of phones that cannot find a dial tone. It is known in the prior art to automatically filter error logs through "rule sets" to determine if a combination of logs satisfies a given criteria. One example of such an automated process is a product from Plexis called Plexis EDI Toolkit. If the criteria is satisfied, it is known in the art either to generate a further log or to provide an overall summary for describing the problem to the technician. Thus, it is known to generate Higher Level Logs (HLL) from Lower Level Logs (LLL) in response to predetermined rule sets being satisfied. The Lower Level Logs (LLL) are generated by network applications or devices. Such systems are valuable because the HLLs help to explain to the system administrator/designer what is really going on in the system.

There are instances where HLL's generate more HLL logs, or combinations of LLL's and HLL's generate new HLL's. Since HLL's are generated by LLL's and possibly other HLL's, the technician needs to see how the HLL's are triggered since rule-sets can be complex and not easily understood.

According to the present invention, each LLL that is part of a satisfied rule-set is displayed as a node with a link to the HLL node output from the satisfied rule-set. If an HLL is part of a different and satisfied rule-set, then a link is made from the HLL node to the other HLL node output from the satisfied rule-set. The size of the tree depends on the number of LLL and HLL that satisfy the rule-sets. A log that does not satisfy any rule-set may be shown as an independent node with no links to other nodes.

Figure 1:
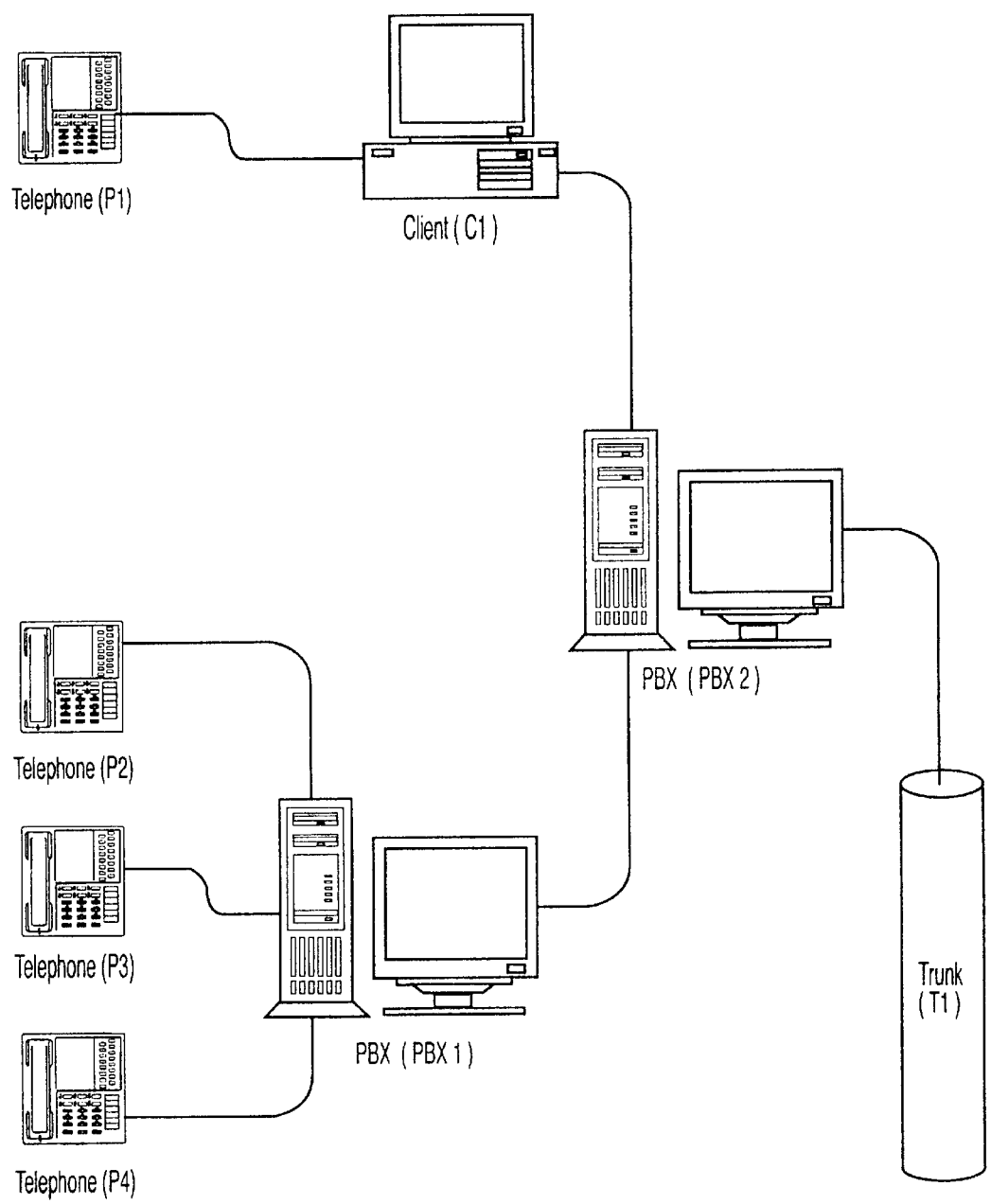
FIG. 1 is a block diagram of an exemplary network incorporating the system of the present invention.

FIG. 1 shows a typical network comprising a plurality of phones (P1 to P3) connected to a server implemented PBX (PBX 1), a further phone P1 connected to a client server C1, both the client C1 and PBX 1 being connected to a PBX2. The PBX 2 is connected to a T1 trunk in a well known manner. Each of the devices shown in FIG. 1, with the exception of the trunk, has the capability of generating logs to inform a technician of the device status. The tree hierarchy is generated using software tools (Visual Basic, C++) to read the logs, parse the logs to determine LLL's and HLL's, use a Graphical User Interface (GUI) as shown in FIG. 5 to show the tree links, and assign boxes for each log with an explanation field for users to enter their comments or read previously saved explanations.

The network configuration of FIG. 1 is for illustration purposes only, and may incorporate a host of other devices and networks.

As indicated above, FIG. 2 demonstrates a set of rule sets that are defined for use in the network in FIG. 1, and FIG. 3 shows a typical list of logs (HLL's and LLL's) that are generated from the network in FIG. 1. The system parses the Brief Description in order to identify the source of a particular error log.

According to the invention, a network administration system is provided for displaying a tree hierarchy in response to the generation of error logs. Operation of the system to generate the tree hierarchy is set forth in greater detail below with reference to FIGS. 4, 5 and 6. Returning to FIG. 1, the inventive system is incorporated into PBX 2. Alternatively, the network administration system may be implemented in a separate server connected to the network.

Figure 4:
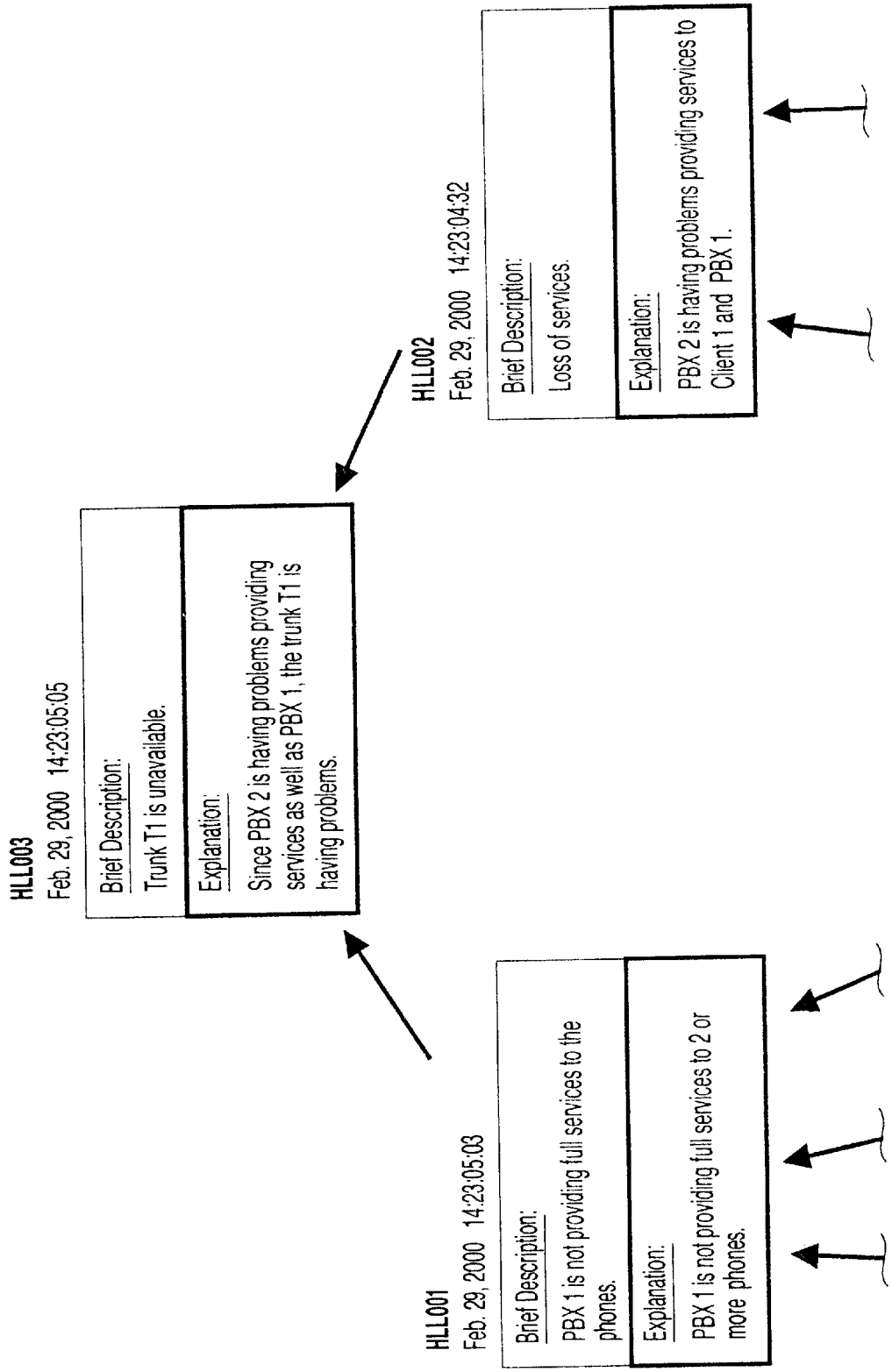
FIG. 4 shows a tree hierarchy generated from the logs generated in FIG. 3, according to the present invention.
Figure 4:
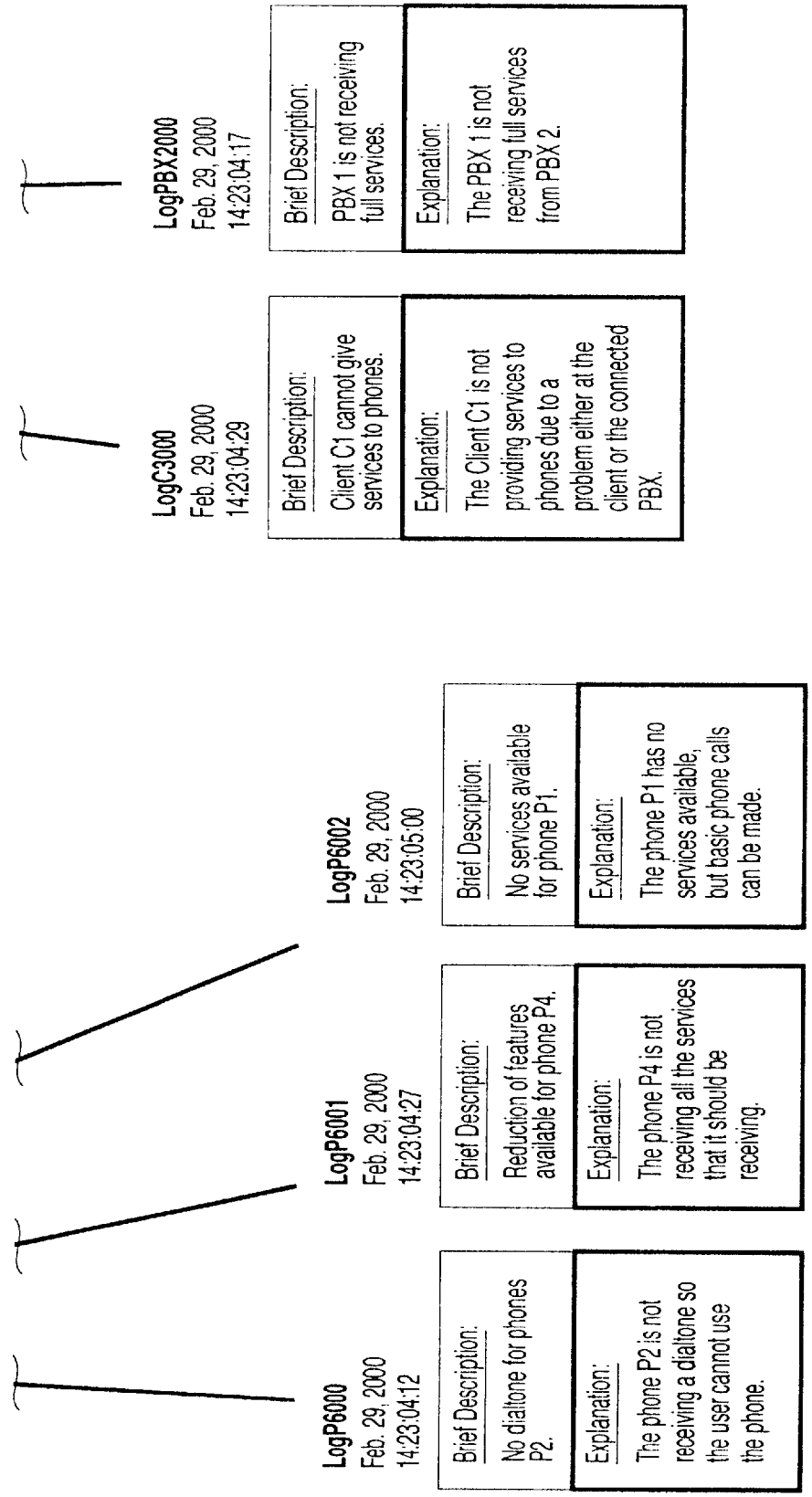

As shown in FIG. 4, a tree hierarchy is generated for showing links between HLLs and LLLs to facilitate the identification and correction of network problems. For the illustrated example, error logs P6000, P6001 and P6002 are generated by devices in the network, resulting in creation of HLL001. LogC3000 and LogPBX2000 result in creation of HLL002. Furthermore, HLL001 and HLL002 result in creation of HLL003. When displayed to the user via a monitor at PBX 2, the identification and solution of network problems is greatly simplified over prior art techniques.

Returning to FIG. 5, a logs tree hierarchy menu GUI screen is shown for assigning boxes to each log with an explanation field for users to enter their comments or read previously saved explanations.

Figure 6:
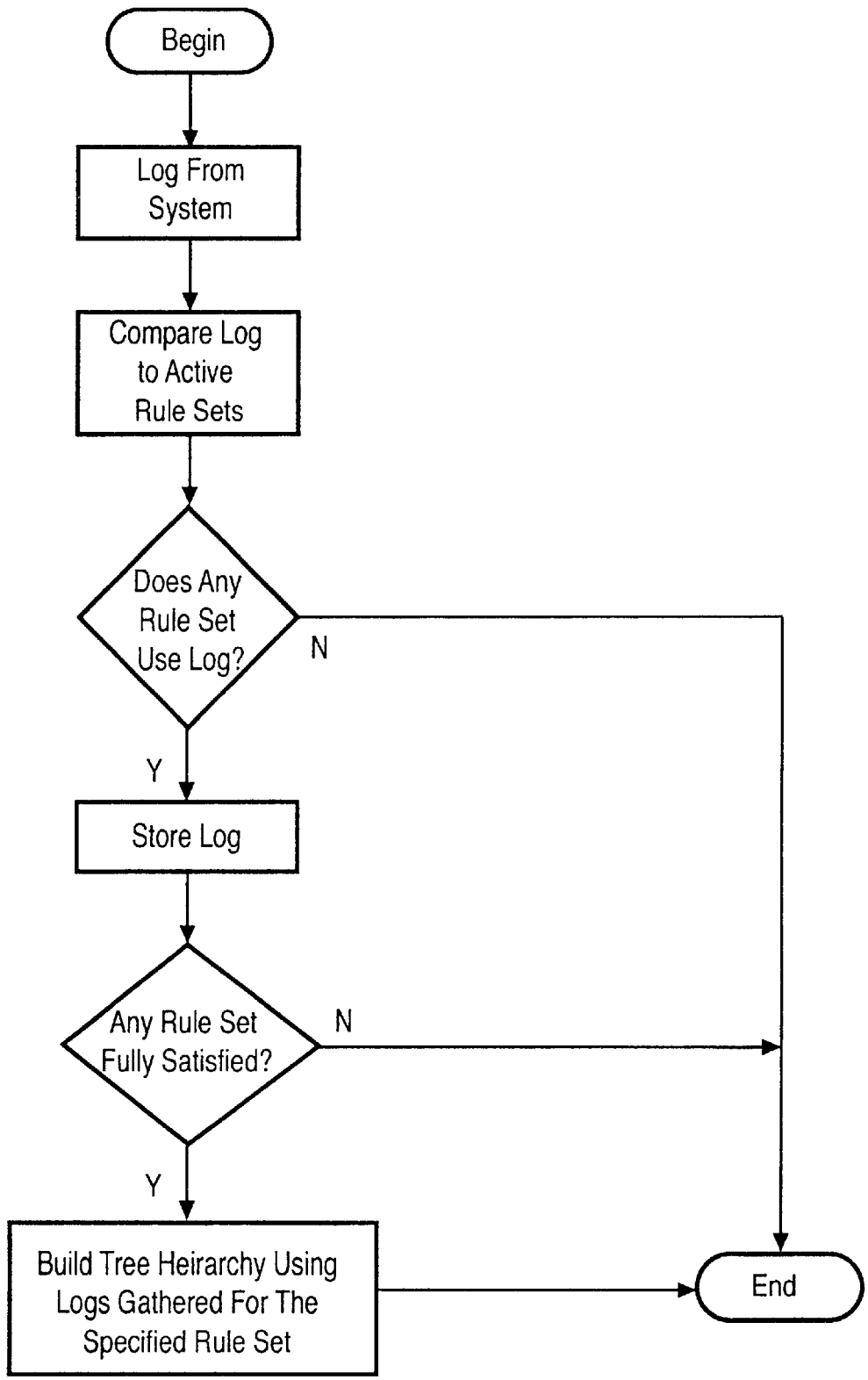
FIG. 6 is a flowchart showing process flow for building a tree hierarchy according to the preferred embodiment.

As shown in FIG. 6, and as set forth in pseudo-code herein below, the received error logs are compared to active rule sets (FIG. 2). I the log is used in one of the rule sets, it is saved. Otherwise, the program ends. If the criteria for any of the stored rule sets is satisfied, then the system builds a tree hierarchy (FIG. 4) from logs specified by the satisfied rule set. After building the tree hierarchy, or in the event that none of the rule set criteria are fully satisfied, the program ends.

Exemplary pseudo-code of the process for implementing the network administration system of the present invention is as follows:

Program function log tree hierarchy
Retrieve log
Compare log to active rule sets
If any rule set uses log
  Store log
  If any rule set fully satisfied
    Attach links to logs in relation to satisfied rule sets
    Parse description in logs
    Attach explanations to each log
    While(HLLs in tree not connected to related rule sets)
      Traverse tree to find HLL
      If current HLL came from a different rule set
        Attach link from current HLL to its ancestor HLL
      endif
    endwhile
  endif
endif
End of log tree hierarchy Alternatives and modifications of the invention are possible within the sphere and scope as set forth in the claims appended hereto.

What is claimed is:

1. A network administration system for generating a tree hierarchy display of error logs received from network devices and applications, each of said logs including a brief description of error cause and predeterimined higher level ones of said logs being created in response to generation of predetermined combinations of lower level ones of said logs in accordance with user defined rule set criteria, said system comprising:

a user interface for entering explanations associated with predetermined ones of said error logs; and program means for storing said lower level ones of said logs used in meeting said rule set criteria, and for any fully satisfied rule set criteria automatically displaying a tree hierarchy of said logs by attaching links between said logs in relation to said rule set criteria, wherein said program means further includes parsing means for parsing the description in each of said logs, and attachment means for automatically attaching said descriptions and explanations to said logs.

2. The system of claim 1, wherein said program means further includes means for traversing said tree hierarchy to identify any of said higher level ones of said logs not connected via said links and automatically attaching said logs to their ancestor logs.

3. A method of generating a tree hierarchy display of error logs received from network devices and applications, each of said logs including a brief description of error cause and predetermined higher level ones of said logs being created in response to generation of predetermined combinations of lower level ones of said logs in accordance with user defined rule set criteria, said method comprising the steps of:

generating a user interface for entering explanations associated with predetermined ones of said error logs;

storing said lower level ones of said logs used in meeting said rule set criteria, and automatically displaying a tree hierarchy of said logs for any fully satisfied rule set criteria by attaching links between said logs in relation to said rule set criteria, and automatically attaching said descriptions and explanations to said logs for display within said tree hierarchy.

4. The system of claim 3, further comprising the step of traversing said tree hierarchy to identify any of said higher level one of said logs not connected via said links and attaching said logs to their ancestor logs.

* * * * *